United States Patent [19]

Lovely et al.

[11] Patent Number: 4,968,112
[45] Date of Patent: Nov. 6, 1990

[54] APPARATUS FOR PROVIDING DEPOLARIZED LIGHT

[75] Inventors: Peter S. Lovely, Portland, Oreg.; Leon McCaughan, Madison, Wis.; Edwin B. Osgood, Beaverton, Oreg.

[73] Assignee: Smiths Industries Aerospace and Defense Systems Incorporated, Grand Rapids, Mich.

[21] Appl. No.: 460,763

[22] Filed: Jan. 4, 1990

[51] Int. Cl.$^5$ .......................... G02B 6/26; G02B 6/10; G02B 5/30
[52] U.S. Cl. .............................. 350/96.15; 350/96.14; 350/370; 350/374
[58] Field of Search ............... 350/96.10, 96.11, 96.12, 350/96.13, 96.14, 96.15, 96.30, 370, 374, 311, 377

[56] References Cited

U.S. PATENT DOCUMENTS

| | | | |
|---|---|---|---|
| 3,284,632 | 11/1966 | Niblack et al. | 350/370 X |
| 3,722,982 | 3/1973 | Brandt | 350/147 |
| 3,780,296 | 12/1973 | Waksberg et al. | 350/370 X |
| 4,531,811 | 7/1985 | Hicks, Jr. | 350/96.15 X |
| 4,669,815 | 6/1987 | Thaniyavarn | 350/96.15 |
| 4,691,984 | 9/1987 | Thaniyavarn | 350/96.14 |
| 4,729,622 | 3/1988 | Pavlath | 350/96.15 |
| 4,732,444 | 3/1988 | Papuchon et al. | 350/96.14 |
| 4,746,184 | 5/1988 | Gang | 350/96.15 |
| 4,756,588 | 7/1988 | Granestrand | 350/96.14 |
| 4,776,656 | 10/1988 | Sanford et al. | 350/96.14 |
| 4,791,388 | 12/1988 | Sanford et al. | 350/96.14 |
| 4,898,441 | 2/1990 | Shimizu | 350/96.14 |
| 4,923,290 | 5/1990 | Brinkmeyer et al. | 350/96.13 X |

OTHER PUBLICATIONS

M. P. Gold, "Design of a Long-Range Single-Mode OTDR", IEEE J. of LIghwave Tech., Lt-3, 1, 39 (1985).
T. Horiguchi et al., "An Acoustooptical Directional Coupler for an Optical Time-Domain Reflectometer", IEEE J. Lightwave Tech., Lt-2, 2, 108 (1984).
E. Brinkmeyer et al., "Reduction of Polarization Sensitivity of Optical-Time Domain Reflectometers for Single-Mode Fibers", IEEE J. Lighwave Tech., LT-4, 5, 513 (1986).
T. Horiguchi et al., "Birefringent Launching Fibers for Reducing Back-Scattered Power Fluctuations in Polarization-Sensitive Optical-Time-Domain Reflectometers", J. Opt. Soc. Am., 2, 10, 1689 (1985).
T. Horiguchi et al., "A Novel Technique for Reducing Polarization Noise in Optical-Time Domain Reflectometers for Single-Mode Fibers", IEEE J. Lighwave Tech., LT-3, 4, 901 (1985).
B. G. Koehler et al., "In-Line Single-Mode Fiber Polarization Controllers at 1.55, 1.30, and 0.64 $\mu$m", Applied Optics, vol. 24, No. 3, 349 (1985).

*Primary Examiner*—Brian Healy
*Attorney, Agent, or Firm*—Dellett, Smith-Hall and Bedell

[57] ABSTRACT

Apparatus for depolarizing light received from a source of light comprises a body of material that defines an optical waveguide, the material of the body and the length of the waveguide being such that when polarized light is propagated through the waveguide, light in one of two polarization eigen states is retarded relative to light in the other polarization eigen state by a time such as to destroy phase coherence between the polarization eigen states of the light emitted by the source. The relative amplitudes of the two polarization eigen states of polarized light entering the wave-guide are adjusted.

6 Claims, 1 Drawing Sheet

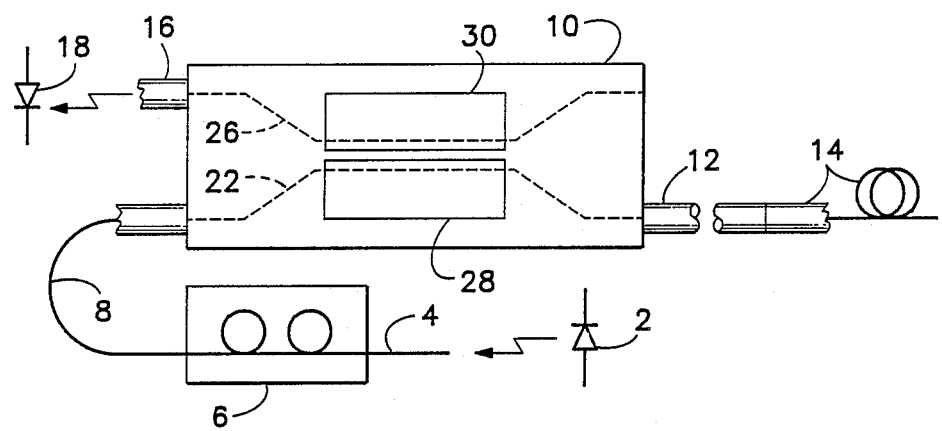

APPARATUS FOR PROVIDING DEPOLARIZED LIGHT

BACKGROUND OF THE INVENTION

This invention relates to apparatus for providing depolarized light.

In a conventional optical time domain reflectometer (OTDR), light emitted from a laser diode is applied to a directional coupler. In the bar state of the coupler, the light from the laser diode is launched into an optical fiber under test. In the cross state of the coupler, backscattered light from the fiber under test is directed towards a detector, such as an avalanche photodiode.

Normally, the light emitted by a laser diode is linearly polarized, and therefore the backscattered light received by the detector also is polarized, but the relative amplitudes of the two polarization eigen states will vary due to small variations in the birefringence of the fiber under test as a function of its length. If the detector is sensitive to the polarization state of light that it receives, or the directional coupler has different transmissions in the cross state for the two polarization states, the signal provided by the detector is modulated in response to the variations in the birefringence of the fiber under test. The effect whereby the output signal provided by the detector is modulated in this manner is known as polarization ripple, and is generally undesirable. Polarization ripple can be eliminated by reducing the polarization sensitivity of the detector and making the directional coupler polarization insensitive in the cross state, or depolarizing the launched laser light, or a combination of these measures.

Light that is polarized can be characterized in terms of the relative amplitudes of the two polarization eigen states and the phase coherence between the two polarization eigen states. If light is linearly polarized, all the energy in the optical field is in one of the polarization states, and the amplitude of the other polarization state is zero. For light that is partially polarized, the amplitudes of the two polarization states are both non-zero, and there is partial phase coherence between the two states. For light that is depolarized, the amplitudes of the two polarization eigen states are equal and there is no phase coherence between the two states.

When the amplitude of the optical output provided by a laser diode is plotted as a function of wavelength, the curve is composed of a series of narrow peaks, or longitudinal modes, at wavelengths that are integral sub-multiples of twice the length of the laser diode channel. The Fourier transform of the amplitude curve is approximately Gaussian in form, and the width of the Fourier transform curve at the amplitude that is $(1/e^2)$ times its maximum amplitude is referred to as the coherence time associated with the longitudinal modes. The coherence time associated with the longitudinal modes depends inversely on the width of the longitudinal modes.

The longitudinal modes have an envelope that is approximately Gaussian in form. The autocorrelation function of the light source is the Fourier transform of the envelope of the longitudinal modes and is composed of closely spaced peaks within an envelope formed by the Fourier transform of the amplitude curve. The width of one of these peaks at the amplitude that is $(1/e^2)$ times the maximum amplitude of the peak is referred to as the coherence time associated with the autocorrelation function, and depends inversely on the bandwidth of the laser diode. The spacing of the peaks of the autocorrelation function depends inversely on the spacing of the longitudinal modes.

A typical laser diode used in OTDRs emits light with a bandwidth of 2 nm and a coherence time associated with the autocorrelation function of about 3 ps.

If light in one of the polarization states is retarded relative to light in the other state by a time that is greater than the coherence time associated with the longitudinal modes of the laser diode, phase coherence between the two polarization states is destroyed. Alternatively, phase coherence is destroyed if light in one state is retarded relative to light in the other by a time that is greater than the coherence time associated with the autocorrelation function of the laser diode and is approximately equal to $(n+\frac{1}{2})$ times the period of the autocorrelation function, where n is an integer.

When partially polarized light is propagated through birefringent material, light in one of the polarization states is retarded with respect to light in the other polarization state. Unless the retardation exceeds the coherence length (the product of the propagation velocity and the coherence time associated with the autocorrelation function of the light source), phase coherence can be restored.

The polarization sensitivity of an OTDR is proportional to the product of the degree of polarization of the light launched into the fiber under test and the degree of sensitivity of the detector to the state of polarization of the backscattered light received from the fiber under test. The polarization of the launched light can be reduced by placing a depolarizer between the laser diode and the directional coupler, but some forms of couplers have different insertion losses for different polarization states so that the light launched into the fiber under test will be somewhat polarized even if the light received at the directional coupler is completely depolarized. M. P. Gold, "Design of a Long-Range Single-Mode OTDR", *IEEE J. of Lightwave Tech.*, LT-3, 1, 39 (1985) describes the problem of polarization sensitivity, and suggests that the problem may be alleviated by manipulating the fiber under test to scramble the polarization state of light being propagated in the fiber. However, Gold states that it is more effective to avoid polarization sensitivity in the return path of the OTDR.

T. Horiguchi, M. Nakazawa, M. Tokuda and N. Uchida, "An Acoustooptical Directional Coupler for an Optical Time-Domain Reflectometer", *IEEE J. Lightwave Tech.*, LT-2, 2, 108 (1984) describes the problem of polarization dependency in the context of an acoustooptical direction coupler.

E. Brinkmeyer and J. Streckert, "Reduction of Polarization Sensitivity of Optical-Time Domain Reflectometers for Single-Mode Fibers", *IEEE J. Lightwave Tech.*, LT-4, 5, 513 (1986) discusses use of a highly birefringent launching fiber that acts as a depolarizer.

T. Horiguchi, K. Suzuki, N. Shibata and S. Seikai, "Birefringent Launching Fibers for Reducing Backscattered Power Fluctuations in Polarization-Sensitive Optical-Time-Domain Reflectometers", *J. Opt. Soc. Am.*, 2, 10, 1698 (1985) also describes use of a birefringent launching fiber for reducing polarization dependence of an OTDR.

T. Horiguchi, K. Suzuki, M. Shibata, M. Nakazawa and S. Seikai, "A Novel Technique for Reducing Polarization Noise in Optical-Time Domain Reflectometers for Single-Mode Fibers", *IEEE J. Lightwave Tech.*, LT-3, 4, 901 (1985) describes use of a polarization-holding launching fiber to depolarize light launched into the fiber under test and thereby reduce polarization dependence of an OTDR.

B. G. Koehler and J. E. Bowers, "In-line single-mode fiber polarization controllers at 1.55, 1.30, and 0.63 $\mu m$", *Applied Optics*, Vol. 24, No. 3, 349 (1985) describes a polarization controller made from two coils of single mode optical fiber connected in series. Polarized light is introduced into the polarization controller, and by adjusting the relative orientation of the coils, the relative amplitudes of the two polarization eigen states of light leaving the controller can be varied.

SUMMARY OF THE INVENTION

In accordance with a first aspect of the invention, apparatus for depolarizing light received from a source of light comprises a body of material that defines an optical waveguide, the material of the body and the length of the waveguide being such that when polarized light is propagated through the waveguide, light in one of two polarization eigen states is retarded relative to light in the other polarization eigen state by a time such as to destroy phase coherence between the polarization eigen states of the light emitted by the source. The apparatus also comprises means for adjusting the relative amplitudes of the two polarization eigen states of polarized light entering the waveguide.

In accordance with a second aspect of the invention there is provided apparatus for selectively coupling an optical fiber to either a source of polarized light or a light detector. The apparatus comprises a directional coupler having a first port for receiving light from the source, a second port for emitting light towards and receiving light from the fiber, and a third port for emitting light towards the detector. The coupler defines an optical waveguide through which light is propagated from the first port to the second port. When polarized light is propagated though the waveguide, light in one of the two polarization eigen states is retarded relative to light in the other polarization eigen state by a time such as to destroy phase coherence between the polarization eigen states of the light emitted by the light source. The apparatus also comprises means for adjusting the relative amplitudes of the two polarization eigen states of polarized light entering the coupler at the first port.

BRIEF DESCRIPTION OF THE DRAWING

For a better understanding of the invention, and to show how the same may be carried into effect, reference will now be made, by way of example, to the accompanying drawing, the single figure of which is a schematic diagram of an OTDR embodying the present invention.

DETAILED DESCRIPTION

The OTDR illustrated in the drawing comprises a laser diode 2 that emits pulses of polarized light into a single mode optical fiber 4, which is connected to a polarization controller 6. The polarization controller is connected through a single mode fiber 8 to one port of a three-port directional coupler 10. A second port of coupler 10 is connected through a single mode launch fiber 12 to a fiber under test 14, and the third port of coupler 10 is connected through a multimode fiber 16 to a detector 18.

Coupler 10 comprises a die of LiNbO$_3$ having diffused Ti channel waveguides 22, 26 formed therein and having electrodes 28, 30 on its upper surface to control coupling between the waveguides. In the bar state of the coupler, light entering waveguide 22 from fiber 8 is emitted into fiber 12. In the cross state, backscattered light entering waveguide 22 from fiber 12 is coupled to waveguide 26 and is delivered through fiber 16 to detector 18.

Polarization controller 6 is similar to that described by Koehler et al. The relative orientation of the coils is adjusted so that the amplitudes of the two polarization eigen states leaving fiber 12 are equal. Since LiNbO$_3$ can attenuate the TM polarization slightly more than the TE polarization, this implies that the TM polarization entering the directional coupler has a slightly greater amplitude than the TE polarization.

The propagation velocity of the TM polarization in LiNbO$_3$ is slightly less than the propagation velocity of the TE polarization. The difference is propagation velocity is such that the TE polarization is retarded by about 0.255 ps/mm relative to the TM polarization. The length of waveguide 22 is selected so that the TE polarization is retarded by a time that is suitable to destroy phase coherence of the light emitted by laser diode 2. In a particular implementation, in which laser diode 2 emits light at 1300 nm with a bandwidth of 2 nm, the length of waveguide 22 is chosen to be 55 mm, which provides a retardation of 14 ps. This is greater than the coherence time associated with the autocorrelation function of the laser diode and is approximately equal to 3.5 times the period of the autocorrelation function. Consequently, light leaving launch fiber 12 is depolarized, and the OTDR is insensitive to polarization.

It will be appreciated the invention is not restricted to the particular embodiment that has been described, and that variations may be made therein without departing from the scope of the invention as defined in the appended claims and equivalents thereof. For example, the invention is not restricted to the particular type of polarization control that has been described, and adjustment of the relative amplitudes of the TE and TM polarizations entering waveguide 22 may be adjusted using beam optics and retarder plates or by other means.

We claim:

1. Apparatus for depolarizing light received from a source of polarized light, comprising:
    a body of material that defines an optical waveguide, the material of the body and the length of the waveguide being such that when polarized light is propagated through the waveguide, light in one of two polarization eigen states is retarded relative to light in the other polarization eigen state by a time such as to destroy phase coherence between the polarization eigen states of the light emitted by the source, and
    means for adjusting the relative amplitudes of the two polarization eigen states of polarized light entering the waveguide.

2. Apparatus according to claim 1, wherein the body of material comprises a die of LiNbO$_3$ and the optical waveguide is a Ti diffused channel waveguide formed the die.

3. Apparatus according to claim 2, wherein a second waveguide is formed in the die of LiNbO$_3$, and the apparatus further comprises an electrode structure for influencing coupling of light between the two waveguides.

4. Apparatus according to claim 1, wherein the material of the body and the length of the waveguide are such that the retardation is greater than the coherence time associated with the autocorrelation function of the light source and is substantially equal to $(n+\frac{1}{2})$ times the period of the auto-correlation function, where n is an integer.

5. Apparatus for selectively coupling an optical fiber to either a source of polarized light or a light detector, the apparatus comprising:

a directional coupler having a first port for receiving light from the source, a second port for emitting light towards and receiving light from the fiber, and a third port for emitting light towards the detector, the coupler defining an optical waveguide through which light is propagated from the first port to the second port, the material and length of the waveguide being such that when polarized light is propagated from the first port to the second port through the optical waveguide, light in one of two polarization eigen states is retarded relative to light in the other polarization eigen state by a time such as to destroy phase coherence between the polarization eigen states of the light emitted by the source, and means for adjusting the relative amplitudes of the two polarization eigen states of polarized light entering the coupler at the first port.

6. Apparatus according to claim 5, wherein the material of the body and the length of the waveguide are such that the retartdation is greater than the coherence time associated with the auto-correlation function of the light source and is substantially equal to $(n+\frac{1}{2})$ times the period of the autocorrelation function, where n is an integer.

* * * * *